No. 655,515. Patented Aug. 7, 1900.
J. C. ROBBINS.
CRANK SHAFT AND BEARING.
(Application filed May 10, 1897.)
(No Model.)
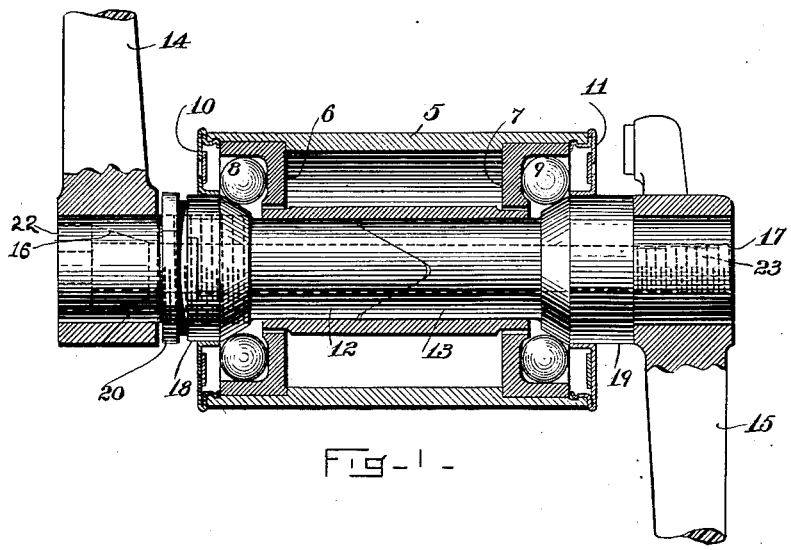
FIG-1-
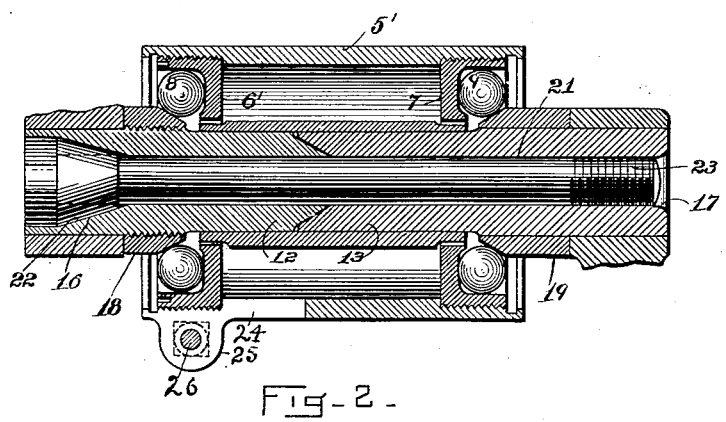
FIG-2-
WITNESSES-
Wm. H. Varnum
Geo. H. Cushman
INVENTOR-
John C. Robbins
by Henry J. Miller
atty.

UNITED STATES PATENT OFFICE.

JOHN C. ROBBINS, OF WALTHAM, MASSACHUSETTS.

CRANK-SHAFT AND BEARING.

SPECIFICATION forming part of Letters Patent No. 655,515, dated August 7, 1900.

Application filed May 10, 1897. Serial No. 635,784. (No model.)

*To all whom it may concern:*

Be it known that I, JOHN C. ROBBINS, of Waltham, in the county of Middlesex and State of Massachusetts, have invented certain new and useful Improvements in Crank-Shafts and their Bearings; and I hereby declare that the following is a full, clear, and exact description of the same, reference being had to the accompanying drawings, forming part of this specification.

This invention relates to improvements in crank-shafts and their bearings, and is particularly applicable to bicycles.

One object of the invention is to so construct ball-bearings, comprising two oppositely-acting raceways and balls between them, that the parts of the bearing may be separated and reassembled without the adjustment of either raceway.

Another object of the invention is to so construct a crank-shaft and its bearings that the ball-bearing members carried by the separable portions of the shaft may be fixed against adjustment.

The invention consists in a shaft formed of separable sections and a securing device therefor, which when assembled have positive and unadjustable length, ball-bearing ways mounted on the shaft-sections and limited in their movement toward each other by the intermediate portions of the shaft, together with a sleeve, oppositely-facing ballways mounted therein, which are unaffected by the separation of the shaft-sections, and balls between each pair of ballways.

The invention consists in such other novel features of construction and combination of parts as shall hereinafter be more fully described, and pointed out in the claim.

Figure 1 represents a vertical sectional view of a crank-barrel and its ballways, illustrating my invention. Fig. 2 represents a similar view showing a modified form thereof.

Similar numbers of reference designate corresponding parts throughout.

In more fully describing this invention it should be remembered that a shaft is formed of separable sections as a means to an end, that end being the more ready access to the bearings for cleaning purposes. If this separation results in the disturbance of the adjustment of the ballways, the benefit of the separation is lost, for the solid shaft could be readily withdrawn and replaced by this same disturbance.

The normal positions of the relative parts of crank-shaft and its bearing is when the parts are secured together and the ballways adjusted to a nicety with relation to the cones.

The problem sought to be solved by this invention is that of readily separating the ball-bearing members and of reassembling them without adjustment. While it is essential that some portion of the ball-bearing should be adjustable, it is of almost equal importance that under normal conditions the ball-bearing members should be fixed to their respective supports and that the movement of the movable supports should be positively limited to such a degree as will not effect the adjustment of the ball members, for the slightest independent movement of the ball-bearing members on their supports, without the use of the device for limiting their replacement, results in disturbing the adjustment of the bearing.

In the drawings, 5 indicates the barrel in which the outwardly-facing ballways 6 and 7 are secured in any suitable manner, in order that they may maintain their degree of separation. In these ways are the sets of balls 8 and 9, which are held in the ways by the ball-retainers 10 and 11, secured to the barrel.

The crank-shaft is formed by the tubular interlocking sections 12 and 13, which abut against each other, so that the length of the shaft is constant when in place. Each of the shaft-sections is provided with a crank-arm 14 or 15, the bore of the section 12 having a conical socket 16, while the bore of the section 13 has a screw-threaded portion 17. On the shaft-sections are secured the inwardly-facing cones 18 and 19, the cone 18 being furnished with a lock-nut 20, whereby it may be locked in place.

As a means for securing the two shaft-sections together I make use of the bolt 21, having the conical head 22, which is received in the socket 16 and is furnished with a key-seat for the engagement of a key by which the bolt may be rotated. At its opposite end the bolt has a screw-thread 23, which engages the internal screw-thread 17 in the section 13.

In the modified form shown in Fig. 2 the barrel 5' is furnished with a longitudinally-split portion at 24, the edges of which have the ears 25, through which the binding-bolt 26 passes to draw the ears together, thus binding this end of the barrel on the periphery of the ballway 6', adjustably secured in the barrel. In this construction the cones may be fixed on the respective shaft-sections.

The shaft, with its bearings, is herein shown as applied to a crank; but I do not confine myself to this use, it being obvious that the crank-arms may be omitted and the proportions of the various parts sufficiently changed to adapt the same to use in other mechanism.

After the shaft has once been mounted in place and secured by its bolt the ballways can be adjusted with relation to their degree of separation, this depending on the diameter of the balls. The removal of the shaft by the separation of the shaft-sections does not then effect the adjustment of the ballways, the positions of the raceways being fixed by the length of the barrel and those of the cones with relation to the raceways being determined by the intermediate length of the shaft, as precisely as if the shaft was solid and unseparable.

Having thus described my invention, I claim as new and desire to secure by Letters Patent—

A shaft and bearing therefor comprising a sleeve, outwardly-facing ballways in the sleeve, balls in the ballways, a shaft formed of tubular interlocking sections each furnished with an inwardly-facing ballway, said shaft-sections being adapted to abut when placed in the sleeve and to positively determine, at this time, the bearing of the ballways on the balls without auxiliary aid, and auxiliary locking means for the shaft-sections, contained therein, whereby the locking of the sections does not effect the adjustment of the bearings.

JOHN C. ROBBINS.

Witnesses:
JOHN B. MURPHY,
EDWARD P. STARBUCK.